United States Patent [19]

Torta

[11] 4,395,011

[45] Jul. 26, 1983

[54] MOUNTING AND GUIDING DEVICE FOR ADJUSTABLE MOTOR VEHICLE SEATS

[75] Inventor: Mario Torta, Turin, Italy

[73] Assignee: Lifel di Torta E C. S.A.S., Beinasco, Italy

[21] Appl. No.: 210,709

[22] Filed: Nov. 26, 1980

[51] Int. Cl.³ .................. A45D 19/04; B60N 1/02
[52] U.S. Cl. ................. 248/393; 248/429; 296/65 R; 297/322; 297/335
[58] Field of Search ............. 297/329, 325, 335; 308/3 R, 3.8; 248/393, 429, 430; 296/65 R, 69

[56] References Cited

U.S. PATENT DOCUMENTS

| | | | |
|---|---|---|---|
| 1,875,915 | 9/1932 | Chapman | 248/393 |
| 2,160,015 | 5/1939 | Haberstump | 297/325 X |
| 3,476,435 | 11/1969 | Hitzelberger | 296/65 R |
| 4,004,772 | 1/1977 | Pickels | 248/430 |
| 4,114,945 | 9/1978 | Luntz | 308/3 R |

FOREIGN PATENT DOCUMENTS 1430930 11/1968 Fed. Rep. of Germany .... 296/65 R

Primary Examiner—James T. McCall
Attorney, Agent, or Firm—Sughrue, Mion, Zinn, Macpeak, and Seas

[57] ABSTRACT

A mounting and guiding device for adjustable motor vehicle seats comprises longitudinal C-section guides in which omega (Ω)-section movable guides are slidable. The beams formed by the guides enclose a rack which is formed by a sheet metal strip fitted centrally of the C-section guide and is provided with slots. The seat frame is articulated by uprights onto brackets which are fitted to the front of the guides, and is locked by pins fixed at the rear of the guides. The device has an operating mechanism which comprises bolts engageable in the slots of the racks through the openings in the guides, and is articulated between brackets which are fixed to the rear of the movable guides. The racks are covered and the space beneath the seat is unobstructed to serve as a storage space if required.

13 Claims, 7 Drawing Figures

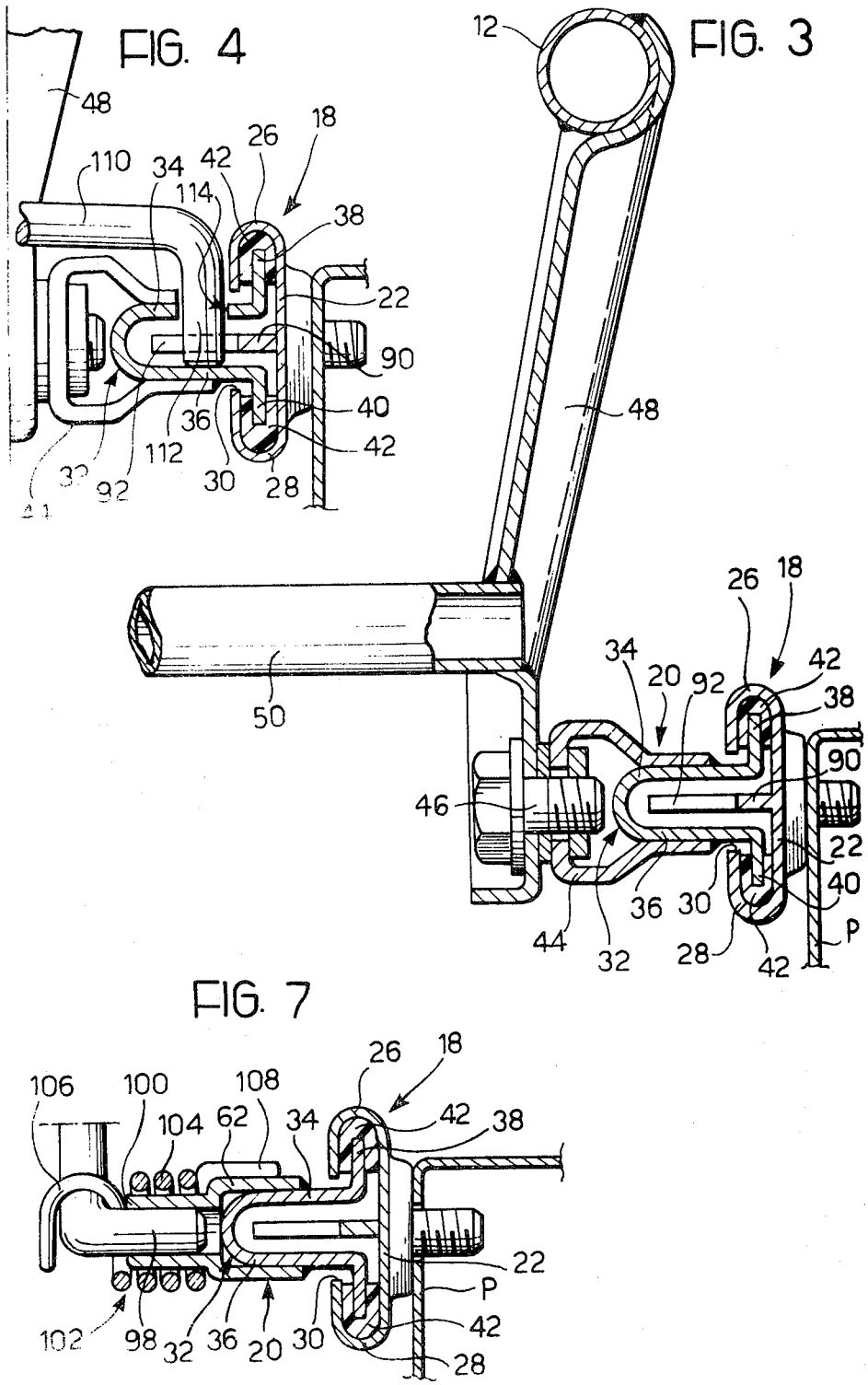

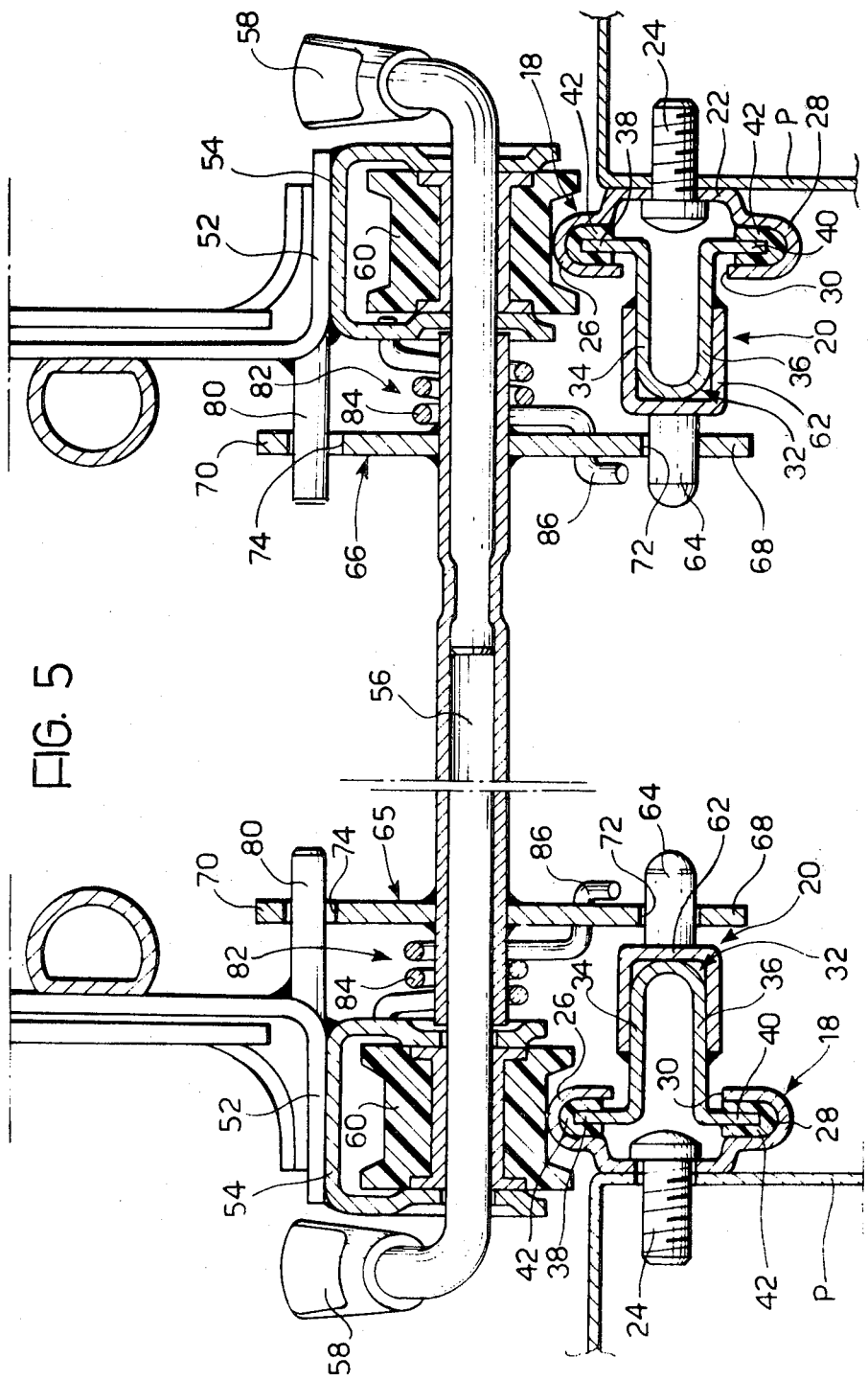

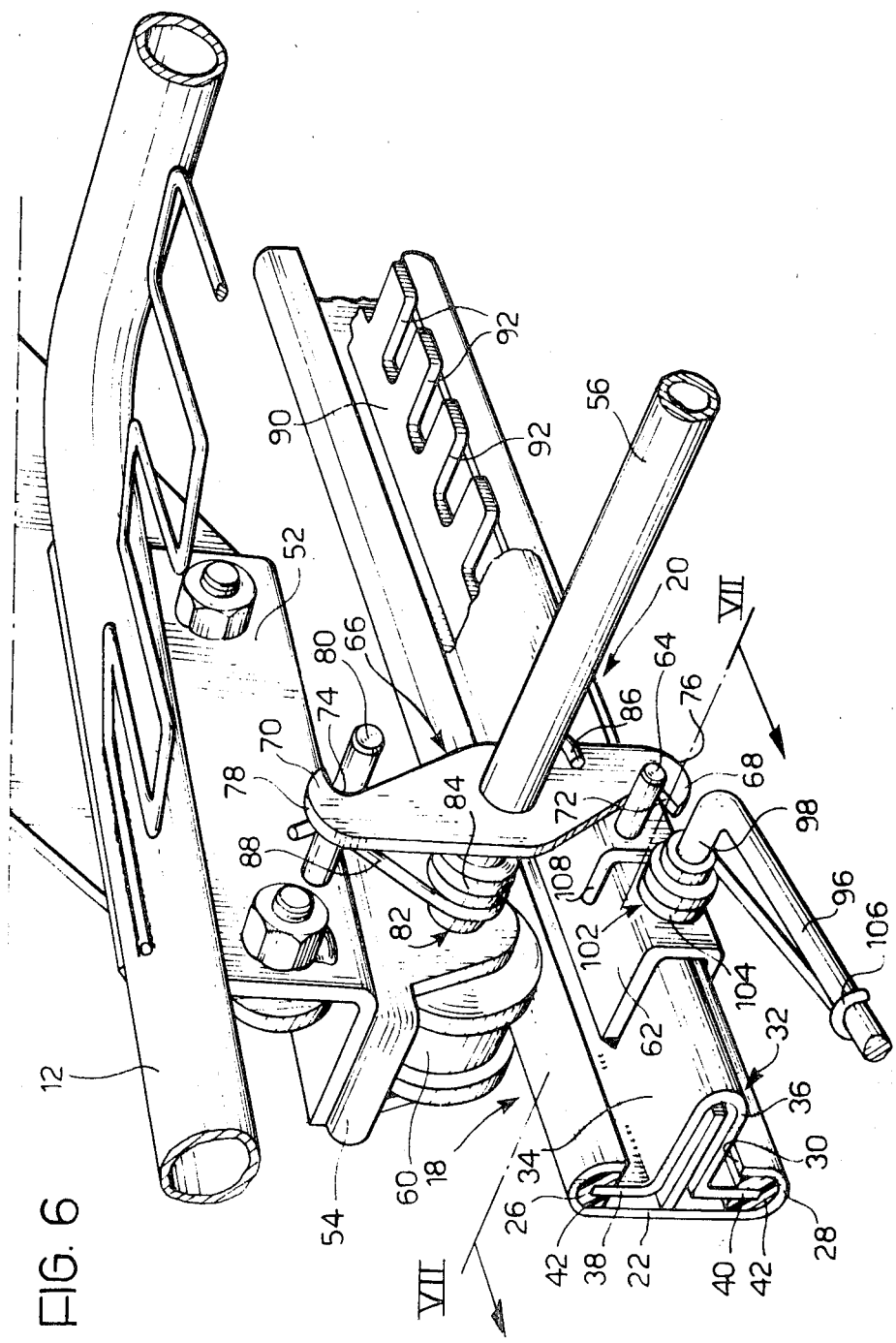

MOUNTING AND GUIDING DEVICE FOR ADJUSTABLE MOTOR VEHICLE SEATS

BACKGROUND OF THE INVENTION

The present invention relates to a mounting and guiding device for adjustable vehicle seats, of the type comprising a frame for the seat base, a pair of fixed guides, which are formed by profiled sheet metal elements fixed to lower parts of the walls on the inside of the vehicle so as to extend substantially horizontally and parallel to each other longitudinally of the vehicle, a pair of movable guides which are formed by profiled sheet metal elements each slidably connected to one of the fixed guides, and support means which connect the movable guides with overlying side members of the base frame, in which at least one of the fixed guides includes a fixed longitudinal rack with a longitudinal array of positioning slots, and the corresponding movable guide includes a hand-operated movable latch which is selectively engageable and disengageable with the slots and is resiliently biassed toward an engagement position for longitudinal positioning of the movable guides and the seat.

Guides for adjustable vehicle seats, particularly the front seats of motor vehicles, are normally secured to the floor of the interior or cab. Guides which are arranged in this way have the disadvantage that their size restricts space beneath the seat which could otherwise be put to better use in stowing articles for transport. A further drawback lies in the fact that articles stowed under the seat may be cut or scratched by contact with the guides.

In many vehicles, and automobiles in particular, that part of the floor to which the seat is fitted (especially the front seats of automobiles) is formed by the bottom of a 'channel' which is flanked by low vertical side walls. The latter may be put to good use when fitting the seat guides, thus leaving the horizontal part of the floor, or bottom of the 'channel' between the vertical walls, completely unobstructed.

In the majority of existing mounting and guiding devices, the rack or racks which position the seat longitudinally are not covered and the positioning slots of these racks consist of lateral notches cut in an edge of a metal sheet. The rack may also cause damage to clothing and articles placed under the seats, as well as personal injury.

SUMMARY OF THE INVENTION

The main object of the present invention is to provide a mounting and guiding device of the type referred to initially which is suitable for an insulation of this type.

The present invention also aims to provide a mounting and guiding device of aforesaid type which, in addition to fulfilling the above mentioned main object, removes the causes of any damage or personal injury from an exposed rack.

The present invention achieves these objects in combination by means of a device of the aforesaid type, characterized in that each fixed guide is of box-section with a side wall facing outwardly of the device for application and fixing to a part of the wall on the inside of the vehicle, and further includes a longitudinal slot which faces inwardly of the device, in that each movable guide comprises a guide part, which is situated within the fixed guide and is slidably connected thereto, and a lateral part, which projects inwardly of the device through the slot and bears the support means, in that the or each rack is formed by a central strip of sheet metal which is fixed to the side wall of the respective fixed guide to extend through the slot, and has the positioning slots formed in a part projecting from the fixed guide, and in that the projecting part of the or each movable guide associated with the or each rack comprises a pair of walls which are spaced above one another and between which the projecting part of the rack is interposed, the latch being slidable through an opening in the projecting part of the movable guide.

Throughout the present specification and claims, the terms denoting positions or directions refer to the device when installed.

A device according to the invention achieves the main object since the sheet metal side walls of the movable guides may be fixed to the vertical side walls which delimit a channel beneath the seat. Moreover, the other object mentioned above is achieved by the enclosure of the rack or racks between the two spaced walls of the projecting part of the movable guide or guides.

BRIEF DESCRIPTION OF THE DRAWINGS

The invention will be better understood by reading the following detailed description of a preferred embodiment, given by way of non-limiting example and illustrated by the attached drawings, in which:

FIGS. 3, 4 and 5 are fragmentary sections, on an enlarged scale, taken along the planes shown respectively by the lines III—III, IV—IV, and V—V in FIG. 1;

FIG. 6 is a fragmentary perspective view, on an enlarged scale, of the part contained within the circle VI of FIG. 1, and FIG. 7 is a fragmentary sectional view taken along a vertical plane shown by the line VII—VII in FIG. 6.

DESCRIPTION OF THE PREFERRED EMBODIMENT

Figure 1:
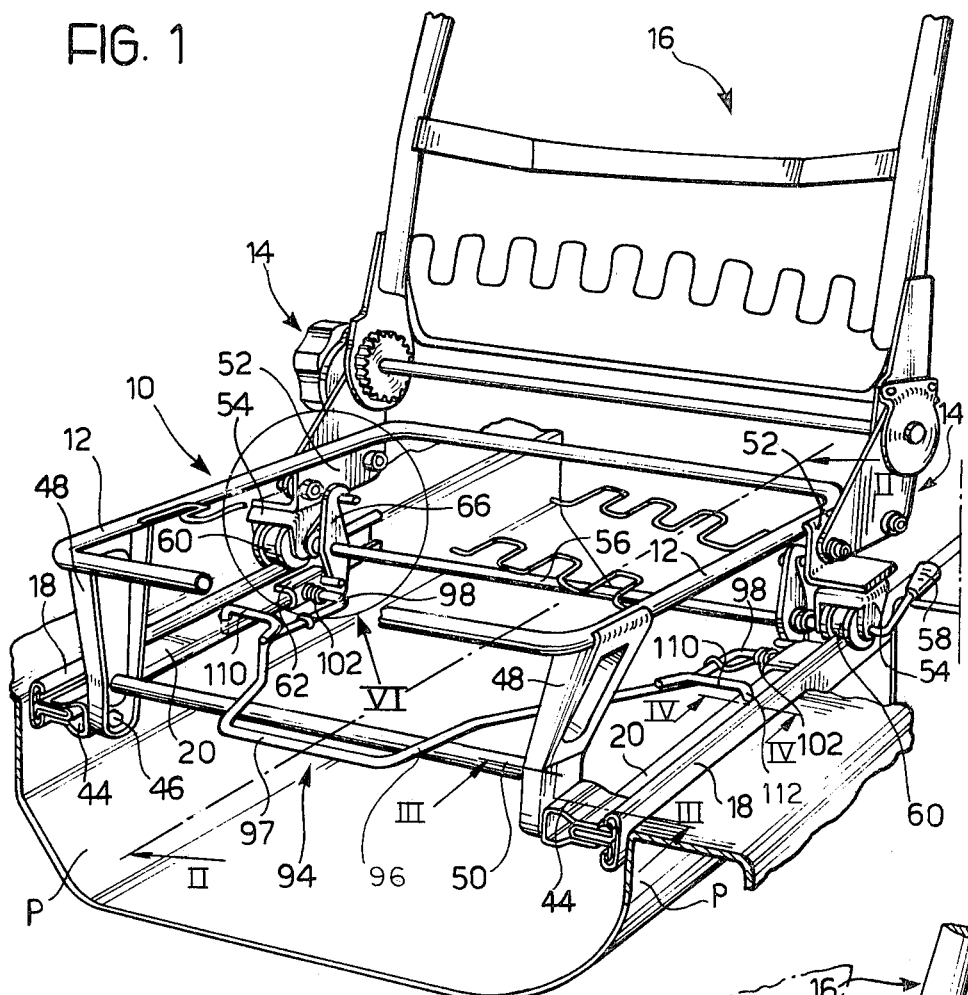
FIG. 1 is a partially cut-away perspective view of a frame for a tipping and adjustable motor vehicle seat incorporating a mounting and guiding device according to the invention, in its installed condition.
Figure 2:
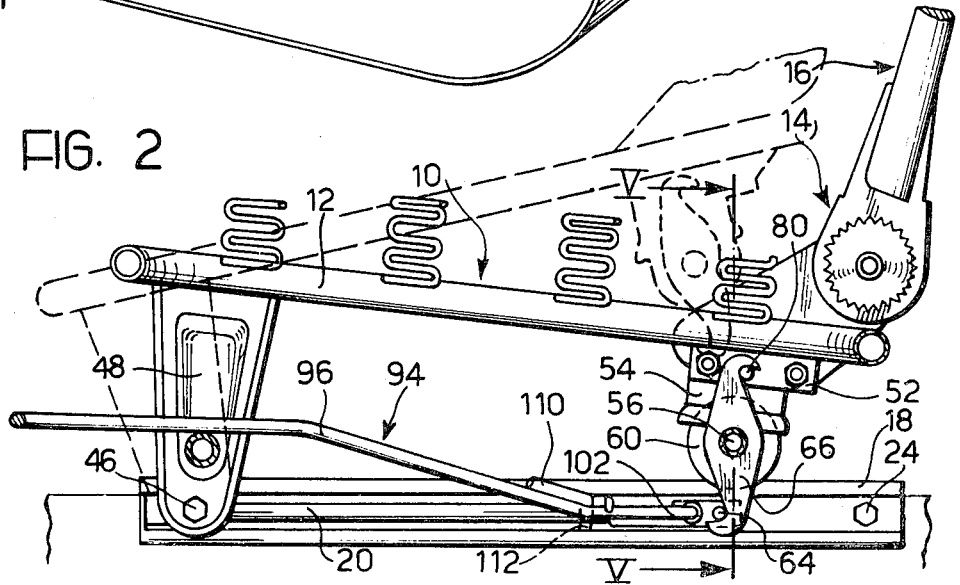
FIG. 2 is a side elevational view of the structure of FIG. 1, the lower part being a longitudinal section taken along the vertical plane shown by the line II—II in FIG. 1.

With reference to FIGS. 1 and 2, the structure of a front seat of a motor vehicle includes a base frame, generally indicated 10, which forms the main part of the framework for a seat cushion. The frame 10 is formed by a closed, circular-section metal tube and has a substantially square or rectangular shape in plan. Two side members of the frame 10 are indicated 12. Connecting plates 14 of known type are fixed near the rear ends of the side members 12 to support the frame 16 forming the main framework of the seatback. The connecting plates 14 enable the inclination of the seatback to be adjusted.

The seat is installed over a part of the floor on the inside of the vehicle, which forms the bottom of a 'channel' defined by a pair of low vertical side walls P. One of these walls P may be a sill of the vehicle body, whilst the other wall P may be a side of the so-called central 'tunnel' for the drive transmission shaft, the transmission housing, or its control mechanisms.

A fixed guide 18 is attached to each wall P, so that two fixed guides 18 extend substantially horizontally and parallel to each other longitudinally of the vehicle, and a movable guide 20 is slidably connected with each fixed guide 18.

The fixed guides 18 and movable guides 20 are formed by profiled sheet metal elements.

The shape of the fixed guides 18 and movable guides 20 can be better seen in FIGS. 3 to 7, and will now be described with reference thereto.

Each fixed guide 18 has a box-section with a flattened C-shape. The center of the C-shape forms a vertical side wall 22 which faces outwards for the attachment of the fixed guide 18 to the respective vertical wall P by a number of screws, such as those indicated 24 in FIGS. 2 and 5. The C-shape has a pair of upper and lower bent flanges 26, 28 which define a longitudinal slot 30. The two flanges 26, 28 form upper and lower opposing guide channels.

Each movable guide has a substantially omega($\Omega$)-shaped cross-section, so as to define a beam 32 with the sectional shape of a flattened U lying on its side. The beam 32 comprises a pair of parallel walls spaced one above the other, the upper wall being indicated 34 and the lower wall being indicated 36. The ends of the two walls 34, 36 of the beam 32 are bent outwards in opposite directions, upwardly and downwardly, so as to define a pair of upper and lower coplanar vertical flanges 38, 40. The two flanges 38, 40 are slidably engaged in respective guide channels 26, 28 with the interpositioning of respective profiled liners 42 of self-lubricating plastics material with a low coefficient of friction, preferably a polyamide material. The liners 42 are fixed to the respective flanges 38, 40 using adhesive or any other suitable means. The external shape of the liners 38 corresponds closely to the profile of the guide channels defined by the flanges 26, 28. As may be clearly seen in FIGS. 3 to 7, the beam 32 of each movable guide 20 forms a lateral part of the guide itself and projects sideways through the slot 30, outwardly of the fixed guide 18 but inwardly of the assembly.

An articulation bracket 44 (FIGS. 1 and 3) is welded onto the projecting part or beam 32 of each movable guide 20, towards the front end of the guide. Each bracket 44 carries a screw-threaded bolt 46, and the two bolts 46 are horizontal and aligned transversely. The lower ends of respective sheet metal uprights 48 are articulated to the brackets 44 by the bolts 46, and the upper ends of the uprights are welded to the side members 12 of the base frame 10 near their front ends. The two uprights 48 are, furthermore, interconnected by a tubular cross member 50 (FIGS. 1, 2 and 3).

It will be understood that the brackets 44, the uprights 48, and the bolts 46 constitute articulated support means for the front part of the seat, allowing it to be tipped forward from its normal position, shown by continuous lines in FIG. 2, to the position shown by broken lines in the same Figure, in order to permit passenger access to the rear seats of a two-door automobile.

The two fixed guides 18 are secured to the side walls P in such a manner that the upper flanges or edges 26 of these guides project slightly above the tops of the walls P, as shown clearly in FIGS. 3 to 5, and 7.

At the rear ends of the two side members 12 of the base frame 10 are fixed respective L-shaped sheet metal brackets 52, the vertical arms of which are bolted to the fixed parts of the connecting plates 14. A sheet metal fork 54 is fixed to the horizontal arm of each bracket, and extending across the two forks 54 is a horizontal transverse shaft 56, the two ends of which are bent at right angles and carry respective knobs 58 for a purpose of which will be explained below. The transverse shaft 56 serves as a pivot for a pair of grooved rollers 60, preferably of wear-resistant plastics material, each of which is inserted in one of the forks 54.

When the seat is in its normal position, as shown by continuous lines in FIG. 2, the rollers 60 rest, in correspondence with their grooves, on the projecting upper flanges or edges 26 of the fixed guides 18, which consequently form supporting tracks for the rollers. Due to the arrangement described and illustrated, the seat assembly is firmly supported, at the back as well as at the front. As it will be appreciated, the seat is guided during longitudinal sliding by virtue of its forward connection, through the brackets 44, with the movable guides 20. During sliding, the rollers 60 run on the upper flanges 26 of the fixed guides 18.

In the area immediately beneath the transverse shaft 56, a further bracket 62 (FIGS. 5 to 7) is welded to the projecting parts or beams 32 of the two movable guides 20. Each bracket 62 carries a lateral retaining peg 64, and a hooked plate, generally indicated 66, is keyed onto the transverse shaft 56 in correspondence with each peg 64. Each hooked plate 66 comprises a pair of lower and upper beak-shaped parts 68, 70 which are identical and arranged symmetrically relative to the transverse shaft 56. Each beak-shaped part is delimited by a radially inner ventral notch 72, 74 respectively, and a radially outer rounded dorsal edge 76, 78 respectively.

The lower ventral notch 72 may be engaged with the retaining peg 64, while the upper ventral notch 74 may be engaged with a stop peg 80 which extends laterally from the bracket 52 fixed to the base frame 10. Each hooked plate 66 is resiliently returned to the engagement position, shown inter alia in FIG. 6, by a pin spring 82. Each spring 82 has a helical part 84 which is wound around the transverse shaft 56, and a pair of opposing arms, one 86 engaging an edge of the plate 66 and the other 88 engaging the stop peg 80.

As will be understood, the function of the hooked plate 66 is to lock the seat in the normal untilted position of FIG. 2. In order to unlock the seat and permit it to tip forward, the user rotates the transverse shaft 56 by operating one of the knobs 58 against the force of the pin spring 84, so that the notch 72 and the retaining peg 64 are disengaged.

If, when the seat is tilted, the user ceases to operate the transverse shaft 56, the two springs 84 cause the latter to rotate in the opposite direction to the unhooking operation. The stop pegs 80 are arranged so that they are engaged by the bottoms of the respective notches 74 in the same angular position of the hooked plate 66 and the shaft 56 as that corresponding to the engagement of the notches 72 and the retaining pegs 64. When the seat then returns to the normal position, through gravity or following deliberate action, the profiled dorsal edges 76 of the lower beak-shaped parts 68 engage the retaining pegs 64 and act as cams, imparting angular movement to the two plates 66 and the shaft 56, against the force of the springs 82, to enable the lower pointed part 68 to pass over the retaining pegs 64 and the latter to become re-engaged in the notches 72. In this manner the seat is automatically refastened in its normal position, without having to use either of the knobs 58.

It will be appreciated that the symmetrical arrangement of the notches 66 (with two identical beak-shaped parts 68, 70) serves no other purpose than to facilitate the assembly of the plates 66 on the shaft 56, since it makes no difference which of the pointed parts is used as the lower or upper part. The profiled dorsal edge 78 of the upper pointed part 70 clearly has no other function once assembly has been effected.

Each fixed guide 18 is provided with a rack which forms one of the members determining the desired longitudinal position of seat adjustment. This rack, shown particularly in FIGS. 3, 4 and 6, is formed by a strip 90 of strong sheet metal. Each strip 90 is fixed to the side wall 22 of the fixed guide 18 and extends horizontally through the slot 30 between the two walls 34, 36 of the beam or projecting part 32 of the movable guide 20. The free edge of each strip 90, remote from the vertical wall 22, has a series of equidistant positioning slots formed by rectangular notches 92.

Beneath the base frame 10 is an operating mechanism which is formed by a metal rod (or similar rod-shaped element), generally indicated 94 and shown in FIGS. 1 and 2. The operating mechanism 94 is substantially V- or U-shaped, with two side arms 96 adjacent to the pairs of guides 18, 20, and a central yoke 97. The yoke 97 forms a handle situated under the front part of the base frame 10.

The ends of the side arms 96, which are remote from the yoke 94, have respective pins 98 formed by parts of the arms 96 bent outwards at right angles. The two pins 98 are aligned horizontally and transversely, and are rotatably mounted in respective bushes 100 (FIG. 7) on the brackets 62 which are fixed to the projecting parts 32 of the movable guides 20 near their rear ends. The operating mechanism 94 is resiliently biased, so that its yoke 97 assumes a lowered position, by a pair of pin springs 102, better seen in FIGS. 6 and 7. Each pin spring 102 comprises a helical part 104 which is wound around the bush 100 surrounding the pin 98, and a pair of opposing arms, of which one arm 106 engages the respective arm 96 of the operating mechanism 94 and the other arm 108 engages the bracket 62.

Each arm 96 of the operating mechanism 94 carries, in an intermediate position, a lateral projection 110 formed by a piece of shaped metal rod which is welded to the arm. Each projection 110 has a downwardly-bent free end 112, better seen in FIG. 4. Each bent end 112 is slidable in a hole or opening which is cut in the upper wall 34 of the beam or projecting part 32 of the movable guide 20, and lies above the area of the rack 90 having the notches 92. As will be seen, the bent end 112 constitutes a latch which may be selectively engaged in the notches 92. The operating conditions are such that the two springs 102 urge the latches 112 towards the rack 90 and into engagement with the notches 92.

In order to adjust the longitudinal position of the seat, the user grasps the yoke 97 of the operating mechanism 94 with his hand and lifts it, thus causing disengagement of the latches 112 from the racks 90. In these conditions the seat is free to slide forwards and backwards by the sliding of the movable guides 20 in the fixed guides 18. Once the most convenient longitudinal seat position has been found, the user only has to release the yoke 97, whereby the latches 112 are re-engaged with the racks 90 by the action of the springs 102. If a notch 92 lies under each latch 112, the latch engages it, locking the seat firmly against sliding. If, however, each latch 112 engages the rack 90 in an area between two notches 92, it is sufficient to move the seat the normal small distance of a few millimeters, forwards or backwards, to engage the notches.

It can be seen that, in a seat mounting and guide device according to the invention, the arrangement of the guides on the side walls P leaves the space beneath the seat completely free. Moreover, the racks 90, being completely enclosed by the beams 32 of the movable guides 20, cannot damage clothing or articles lying under the seat, nor do they have sharp edges capable of causing personal injury.

I claim:

1. In an adjustable motor vehicle seat having a base frame with two side members, a mounting and guiding device of the type comprising:

a pair of fixed guides formed by profiled sheet metal elements having means of attachment to lower internal wall parts of the vehicle so as to extend substantially horizontally and parallel to each other longitudinally of said vehicle;

a pair of movable guides which are formed by profiled sheet metal elements slidably connected to respective said fixed guides;

respective support means which connect said movable guides with respective said side members of said base frame, which overlie said guides;

at least one longitudinal rack fixed to a respective said fixed guide and defining a longitudinal array of positioning slots, and a respective hand-operated movable latch which is selectively engageable and disengagable with the slots of said rack, and is carried on the movable guide corresponding to said fixed guide having said rack, wherein the improvement consists in:

each fixed guide comprising a box-section which defines a longitudinal slot facing inwardly of said device, and a side wall facing outwardly of said device for fixing said guide to a vertical part of said lower internal wall part of said vehicle;

each movable guide comprising a guide part which is slidable within said fixed guide, and a lateral part which projects inwardly of said device through said slot and carries said support means;

each rack comprising a strip of sheet metal fixed centrally to said side wall of said fixed guide so that a part of said rack projects from said slot in said guide, said positioning slots being formed in said projecting part, said projecting lateral part of each movable guide associated with said rack comprising a pair of walls which are spaced above one another and between which is interposed said projecting part of said rack, said projecting lateral part of said movable guide defining an opening in which said latch is slidable, said support means comprising, for each movable guide, an articulation bracket fixed to said projecting lateral part adjacent the front end of said movable guide, and an upright which is articulated at its lower end to said bracket and is fixed at its upper end to the front of a respective said side member of said base frame, said two uprights being pivoted about a common horizontal transverse axis to permit the seat to tip forwards, and said support means further comprising, in correspondence with each fixed guide, a fork mounted at the rear of said side member of said base frame, and a roller which is rotatably mounted in said fork to rest on an upper edge of said fixed guide which serves as a track.

2. A device according to claim 1, wherein each fixed guide has a substantially flattened C-shape in cross-section, having a central portion defining said side wall and flanges which form opposing upper and lower guide channels, and wherein each movable guide has a substantially omega (Ω)-shaped cross-section, including a portion having the sectional shape of a flattened U lying on its side, said portion comprising said projecting lateral part and having upper and lower walls which comprise said walls spaced above one another, said walls having edges bent upwardly and downwardly respectively to define a pair of coplanar vertical flanges which are slidingly engageable in said guide channels formed by said fixed guide.

3. A device according to claim 2, wherein a liner of a plastics material with a low coefficient of friction is fitted around said flanges of each movable guide, said liner having an external profile corresponding to the internal profiles of said guide channels.

4. A device according to claim 1 wherein said two forks are associated with a hooking mechanism comprising: a transverse shaft extending between said forks; at least one hand-operated side lever on said shaft; at least one hooked member keyed onto said shaft; at least one retaining peg fixed to said projecting lateral part of a respective said movable guide for engagement by said hooked member to prevent tilting of the seat, and resilient biasing means for urging a respective said hooked member angularly into engagement with a respective said retaining peg, said hooked member being disengageable against the action of said resilient means.

5. A device according to claim 4 wherein said transverse shaft extends beyond said forks and serves as a pivot for said rollers.

6. A device according to claim 4, wherein a stop peg is fixed to said base frame in correspondence with each hooked member and is situated in the path of rotation of said hooked member for abutment by a part thereof when, under the action of said resilient means, said member is in an angular limit position corresponding to its engagement with said retaining peg, and wherein said hooked member comprises a beak-shaped part which, in a radially inner position relative to said transverse shaft, defines a ventral notch engageable with said retaining peg, and in a radially outer position has a dorsal edge which is cam-shaped and is engageable with said retaining peg to impart angular movement to said plate, against the force of said resilient biasing means, to enable said beak-shaped part to pass over said retaining peg and engage said ventral notch.

7. A device according to claim 6 wherein each hooked member comprises a pair of identical beak-shaped parts which are arranged symmetrically relative to said transverse shaft and have respective said ventral notches engaging said retaining peg and said stop peg, respectively.

8. A device according to any of claims 4 to 7 wherein said resilient biasing means comprise respective pin springs, each said spring having a helical part wound around a respective transverse shaft, and a pair of opposing arms which engage respectively an edge of a respective said hooked member and a respective said stop peg.

9. A device according to claim 1 wherein:
said device includes a latch-operating mechanism in the form of a substantially U-shaped, rod-like element comprising: a respective side arm adjacent each pair of said guides; a central yoke forming a handle located under a front part of said base frame; a respective pivot aligned transversely of said device at an end of each side arm remote from said yoke; a respective pivot bracket fixed to said projecting lateral part of each said movable guide near its rear end, and within which a respective said pivot is rotatable, and resilient biasing means for urging each latch into engagement with a respective said positioning slot;
at least one of said side arms of said mechanism carries, in an intermediate position, a lateral projection with a downwardly-bent free end constituting a respective said latch, and
said upper wall of said projecting lateral part of at least one of said movable guides defines an opening in which said latch is slidable.

10. A device according to claim 9 wherein said resilient biasing means of said operating mechanism comprise respective pin springs, each said spring having a helical part wound around a respective said pivot, and a pair of opposing arms which engage respectively a respective said side arm of said mechanism and a respective said pivot bracket.

11. A device according to claim 9 wherein said mechanism comprises a piece of shaped metal rod, and each said lateral projection comprises a piece of shaped metal rod which is welded to a respective said side arm.

12. A device according to claim 1 wherein said positioning slots in each said rack are formed by notches cut in a free edge of said strip forming said rack.

13. A device according to claim 12 wherein said notches are rectangular.

* * * * *